United States Patent
Buckley et al.

(10) Patent No.: US 10,684,827 B2
(45) Date of Patent: Jun. 16, 2020

(54) GENERATING DYNAMIC MODULAR PROXIES

(71) Applicant: Oracle International Corporation, Redwood Shores, CA (US)

(72) Inventors: Alexander R. Buckley, Cupertino, CA (US); Mandy Chung, Saratoga, CA (US); Alan Bateman, Dublin (IE)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 16/110,702

(22) Filed: Aug. 23, 2018

(65) Prior Publication Data
US 2018/0364989 A1 Dec. 20, 2018

Related U.S. Application Data

(63) Continuation of application No. 14/878,699, filed on Oct. 8, 2015, now Pat. No. 10,083,014.

(60) Provisional application No. 62/215,535, filed on Sep. 8, 2015.

(51) Int. Cl.
| | |
|---|---|
| *G06F 8/30* | (2018.01) |
| *G06F 11/36* | (2006.01) |
| *G06F 9/445* | (2018.01) |
| *G06F 9/455* | (2018.01) |

(52) U.S. Cl.
CPC .......... *G06F 8/315* (2013.01); *G06F 11/3664* (2013.01); *G06F 9/445* (2013.01); *G06F 9/45529* (2013.01)

(58) Field of Classification Search
None
See application file for complete search history.

(56) References Cited

U.S. PATENT DOCUMENTS

| | | | |
|---|---|---|---|
| 6,877,163 B1 | 4/2005 | Jones et al. | |
| 7,093,242 B2* | 8/2006 | Bernadat | G06F 9/445 717/166 |
| 7,774,789 B1* | 8/2010 | Wheeler | G06F 9/44521 719/313 |
| 8,261,297 B2 | 9/2012 | Kabanov | |
| 8,307,380 B2* | 11/2012 | Wheeler | G06F 9/44521 709/201 |
| 8,745,643 B2 | 6/2014 | Kabanov | |
| 8,789,073 B2* | 7/2014 | Wheeler | G06F 9/44521 709/201 |

(Continued)

OTHER PUBLICATIONS

Dynamic Proxy Classes. Oracle, Copyright 1993-2014. Captured Jun 24, 2014 Available at <https://web.archive.Org/web/20140624025327/http://docs.oracle.com/javase/8/docs/technotes/guides/reflection/proxy.html>.

*Primary Examiner* — Matthew J Brophy
(74) *Attorney, Agent, or Firm* — Invoke

(57) ABSTRACT

A runtime environment generates a proxy class in response to detecting a request for a proxy object. The proxy class implements a set of interfaces specified by the request for the proxy object. The runtime environment selects or generates a proxy module, in a module system, to include the proxy class. The runtime environment exposes interfaces from other modules to the proxy module using a qualified export that does not expose the interfaces to modules other than the proxy module. The runtime environment does not expose the proxy class, of the proxy module, to other modules in the module system.

20 Claims, 8 Drawing Sheets

(56) References Cited

U.S. PATENT DOCUMENTS

| | | | |
|---|---|---|---|
| 9,342,274 B2 | 5/2016 | Lucco et al. | |
| 9,477,495 B2* | 10/2016 | Fulton | G06F 8/315 |
| 9,772,828 B2* | 9/2017 | Goetz | G06F 8/437 |
| 9,830,306 B2 | 11/2017 | Leithead et al. | |
| 9,830,448 B2* | 11/2017 | Holt | G06F 21/53 |
| 2004/0019809 A1* | 1/2004 | Sheinis | G06F 21/6218 726/4 |
| 2004/0054696 A1* | 3/2004 | Sheinis | G06F 21/6218 |
| 2004/0153996 A1* | 8/2004 | Boykin | G06F 9/445 717/118 |
| 2005/0050548 A1* | 3/2005 | Sheinis | G06F 9/4488 719/311 |
| 2006/0123390 A1* | 6/2006 | Chan | G06F 9/45512 717/115 |
| 2006/0129880 A1* | 6/2006 | Arcese | G06F 11/3672 714/11 |
| 2006/0242187 A1* | 10/2006 | Scharf | G06F 16/258 |
| 2008/0127141 A1* | 5/2008 | Fulton | G06F 8/315 717/148 |
| 2008/0282266 A1* | 11/2008 | Kabanov | G06F 9/449 719/320 |
| 2010/0198885 A1* | 8/2010 | Bacon | G06F 12/0269 707/813 |
| 2010/0235459 A1* | 9/2010 | Wheeler | G06F 9/44521 709/206 |
| 2011/0088015 A1* | 4/2011 | Shillington | G06F 11/3664 717/125 |
| 2011/0271251 A1* | 11/2011 | Buckley | G06F 21/629 717/120 |
| 2012/0266149 A1* | 10/2012 | Lebert | G06F 9/44563 717/166 |
| 2012/0304044 A1* | 11/2012 | Leithead | H04L 63/04 715/205 |
| 2012/0324433 A1* | 12/2012 | Kabanov | G06F 9/449 717/166 |
| 2013/0067058 A1* | 3/2013 | Bohm | G06F 9/45504 709/224 |
| 2013/0081067 A1* | 3/2013 | Wheeler | G06F 9/44521 719/330 |
| 2014/0365862 A1* | 12/2014 | Qu | G06F 9/548 715/234 |
| 2015/0301837 A1* | 10/2015 | Goetz | G06F 9/443 717/148 |
| 2016/0019385 A1* | 1/2016 | Holt | G06F 21/53 726/22 |
| 2017/0003938 A1* | 1/2017 | Gulkis | G06F 8/315 |
| 2017/0061148 A1 | 3/2017 | Buckley et al. | |
| 2017/0063874 A1 | 3/2017 | Buckley et al. | |

* cited by examiner

GENERATING DYNAMIC MODULAR PROXIES

BENEFIT CLAIM; INCORPORATION BY REFERENCE

This application claims priority as a Continuation of U.S. Non-Provisional application Ser. No. 14/878,699 filed on Oct. 8, 2015 which claims benefit to U.S. Provisional Application No. 62/215,535 filed on Sep. 8, 2015, the content of both of which is hereby incorporated by reference.

TECHNICAL FIELD

The present disclosure relates to dynamic proxies. In particular, the present disclosure relates to generating dynamic module proxies for white-box testing.

BACKGROUND

A module system permits the definition of a set of modules. Each module in a module system corresponds to a respective collection of code. A module system specifies how a collection of code corresponding to a particular module can access code corresponding to other modules. A module descriptor, for a particular module, expresses other modules upon which the particular module may depend. The declaration of a dependency on another module may be referred to as an explicit dependency. A module descriptor also expresses the elements of a particular module that are exposed by the particular module to the other modules. These other modules declare an explicit dependency on the particular module within respective descriptors. Other modules which do not declare an explicit dependency on the particular module are restricted from accessing the elements of the particular module.

A proxy class in a particular module of the module system cannot implement interfaces in other modules that have not been exposed to the particular module. If the proxy class is located in a same module as a first non-exposed publicly accessible interface, the proxy class may implement the first non-exposed publicly accessible interface. However, that proxy class cannot implement a second non-exposed publicly accessible interface within a second different module than the proxy class.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
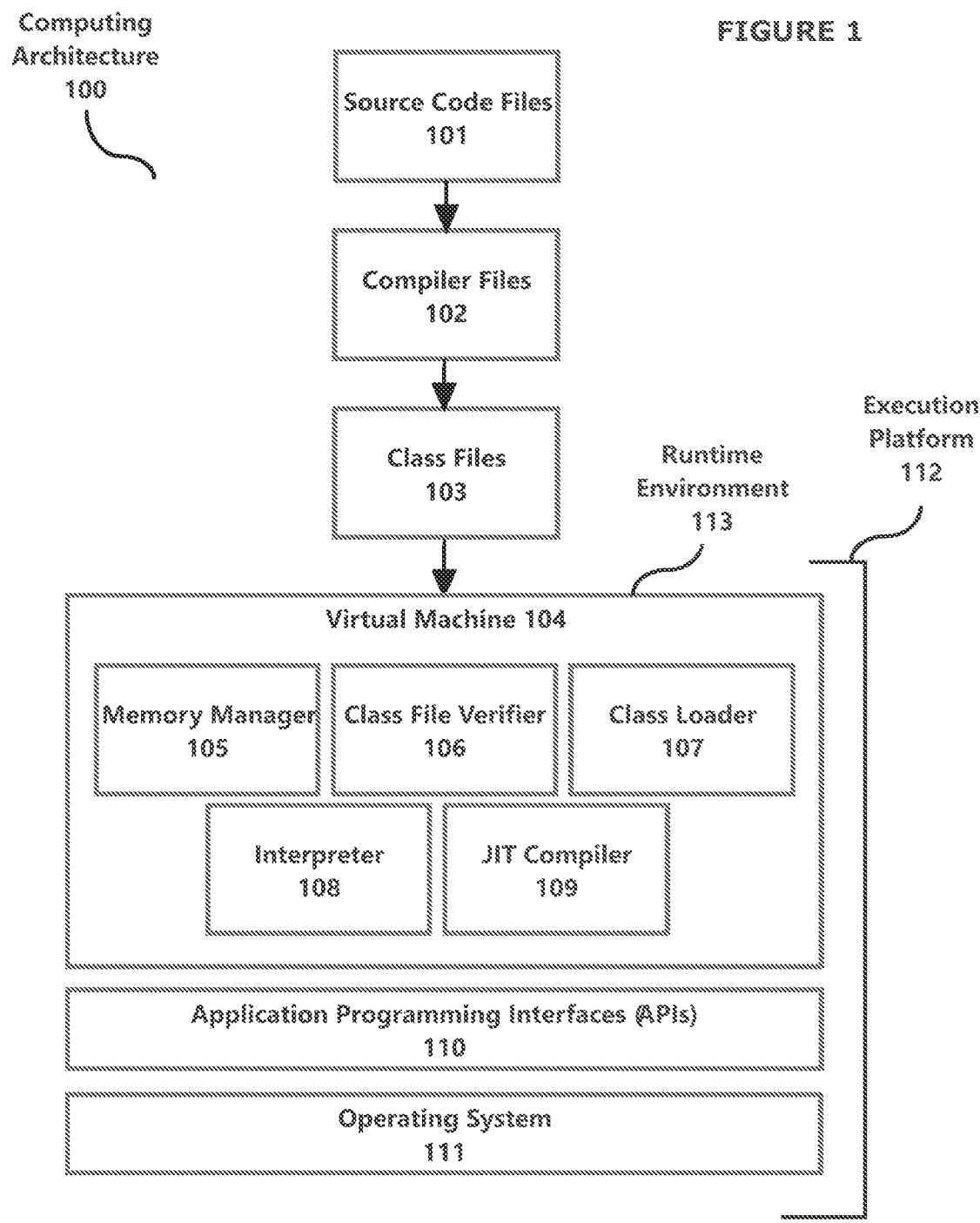
FIG. 1 illustrates an example computing architecture in which techniques described herein may be practiced.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
3. MODULE ELEMENTS OF A MODULE IN A MODULE SYSTEM
4. GENERATING DYNAMIC MODULAR PROXIES
5. MISCELLANEOUS; EXTENSIONS
6. HARDWARE OVERVIEW

1. General Overview

One or more embodiments include a runtime environment (a) generating a proxy class within a particular module of a module system and (b) exposing interfaces of other modules to the particular module of the module system. In one embodiment, the runtime environment exposes at least two interfaces in two other respective modules to the particular module that includes the proxy class using a qualified export. The at least two interfaces may have been module-private interfaces that had not been exposed to any modules in the module system prior to the runtime environment exposing the interfaces to the particular module that includes the proxy class. The runtime environment uses a qualified export to expose the at least two interfaces to the particular module that includes the proxy class without exposing the at least two interfaces to any modules other than the particular module in the module system.

The particular module, which includes the proxy class, may be (a) generated by the runtime environment or (b) selected by the runtime environment from a set of modules already defined by the module system. In an embodiment, the runtime environment does not expose the proxy class, in the particular module, to other modules in the module system. Not exposing the proxy class includes not exposing any module element (e.g., package), of the particular module, which includes the proxy class.

In an embodiment, the runtime environment generates the proxy class in response to a request for a proxy object. In an example, the runtime environment identifies a request for a proxy object from a set of module code ("test framework") in a test framework module. The request for the proxy object includes a set of class objects representing interfaces and a method call processor object. The request may further include a class loader. The runtime environment generates a proxy class that implements each of the interfaces represented by the class objects and returns a proxy object of the proxy class to the requesting test framework module. The test framework traverses/tests the methods of the interfaces implemented by the proxy class at least in part by executing reflective operations on the proxy object.

One or more embodiments described in this Specification and/or recited in the claims may not be included in this General Overview section.

2. Architectural Overview

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into blueprints representing the program to be executed. Examples of the blueprints include class files 103. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 112 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. For many dynamic languages (such as Java) which are designed to allow code to be inserted during the program's execution, a purely compiled approach may be inappropriate. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most time executing a small portion of overall code, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In order to provide clear examples, the source code files 101 have been illustrated as the "top level" representation of the program to be executed by the execution platform 111. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion assumes that each of the class files 103 represents a respective "class" defined in the source code files 101 (or dynamically generated by the compiler 102/virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (1/0) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
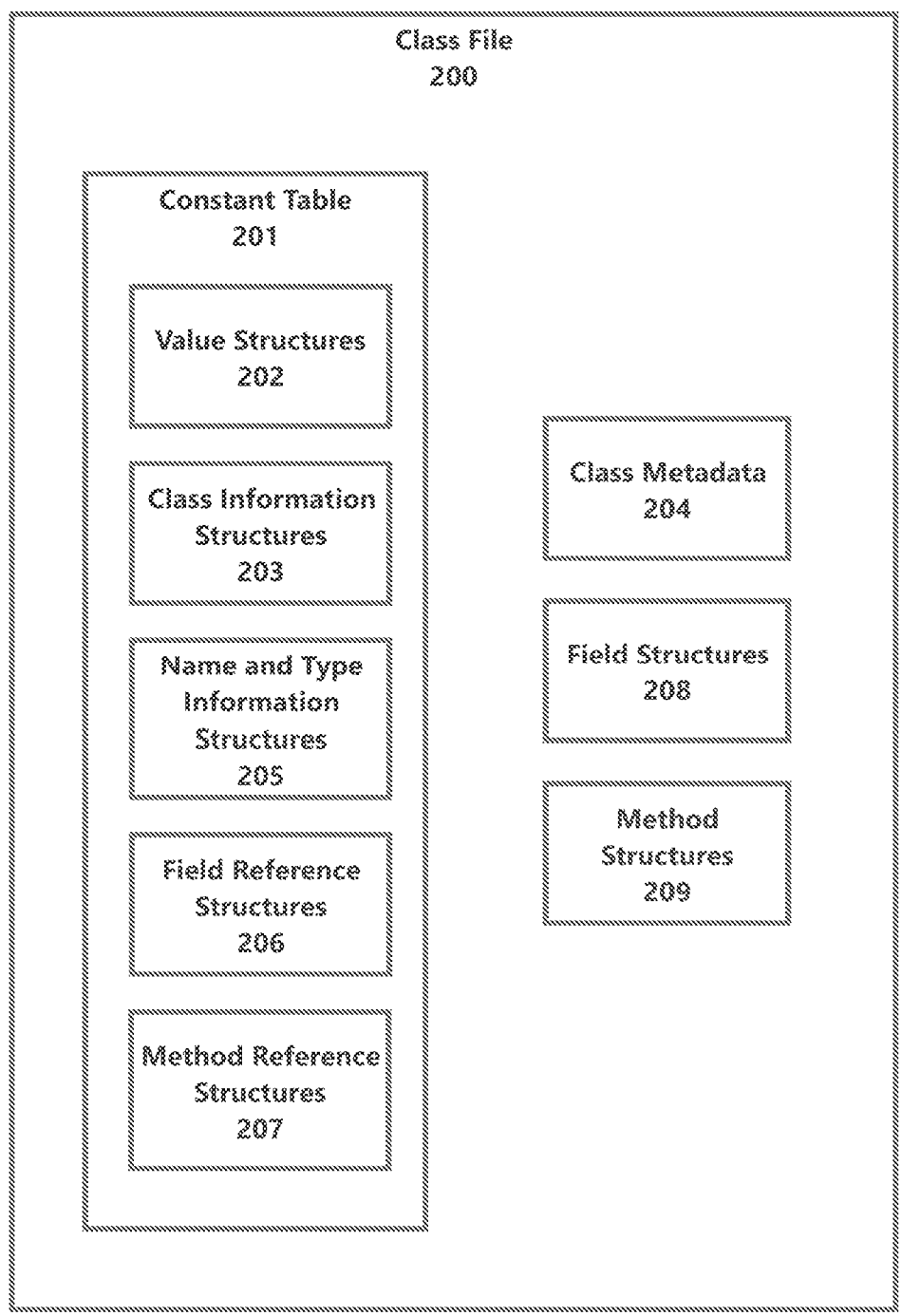
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 is made up of class members including, but not limited to, a constant table 201, field structures 208, class metadata 204, and method structures 209. In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class.

The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, non-public, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, non-public, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, non-public, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m (int I, double d, Thread t) { . . . }" matches the descriptor "(I D L Thread) L Object".

In an embodiment, the virtual machine instructions held in the method structures 209 include operations which reference entries of the constant table 201. Using Java as an example, consider the following class:

```
class A
{
int add12and13( ) {
  return B.addTwo(12, 13);
  }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the runtime environment 112. As will be described in Section 2.3, eventually the run-time representation of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
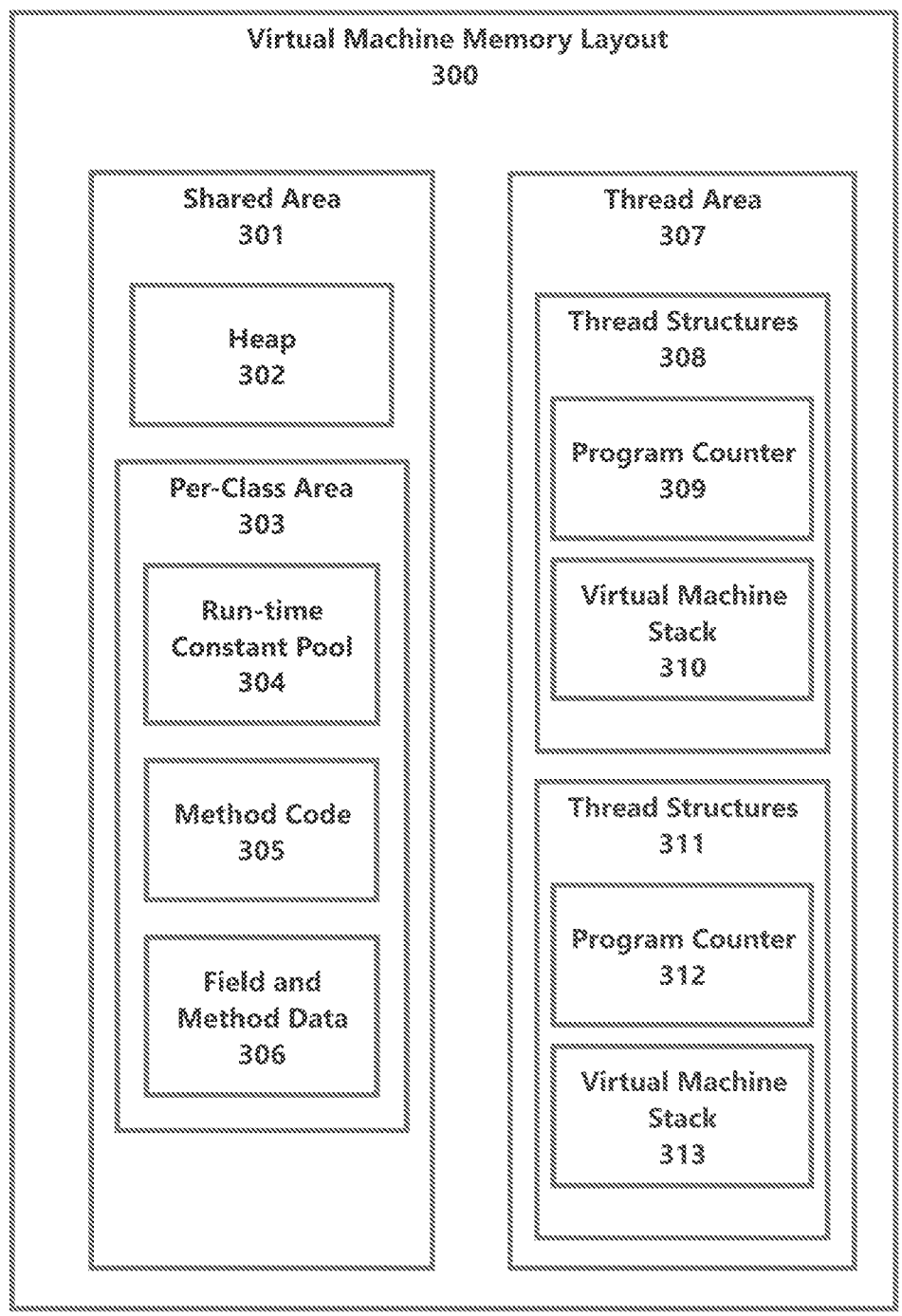
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310 Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 112. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the superclasses of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Module Elements of a Module in a Module System

One or more embodiments are applicable to a module system. Each module within a module system corresponds to a respective set of code (referred to as "module code"). Each module is associated with one or more module elements. A module element, as referred to herein, corresponds to a portion of the module code. A module element (portion of module code) may itself include additional module elements (sub-portions of module code).

Module systems implemented in different programming languages may be defined with different types of module elements. Some examples, described herein, refer to the specific module elements of a module in a Java Module System for purposes of explanation. However, embodiments are equally applicable to module elements of different types in module systems implemented in other programming languages.

In the Java Module System, each module includes one or more packages. Each package includes one or more blueprints representing programs to be executed. An example of a blueprint is a class. Each class includes one or more class members such as fields and methods. Methods, as referred to herein, include constructors which may be invoked for the creation of an object by instantiating classes. A module element, as referred to herein with respect to the Java Module System, may include a package, a class, or a class member. Examples of module elements include but are not limited to an interface and a proxy class that implements the interface.

Exposing Module Elements

In an embodiment, a particular module of the module system may attempt to access a module element of another module of the module system. The module attempting the access is referred to herein as a consumer module and the module with the module element being accessed is referred to herein as a provider module. A module may function as either a consumer module or provider module for different access operations. A module element of a provider module must be exposed to a consumer module in order for the consumer module to successfully access the module element of the provider module.

In an embodiment, the module element, of the provider module, is exposed to the consumer module if any of a set of conditions are met. The set of conditions may include, but are not limited to (a) a declaration within the descriptor of the second module code that exposes the module element to the first module code via a qualified or unqualified export, (b) a user instruction received via a control mechanism (e.g., a command line interface), (c) a determination by the run-time environment based on detection of a triggering event associated with permissions for exposing the module element, and (d) receipt of any instruction that instructs a module system to expose the module element of the provider module to the consumer module.

In an example, a package may be exposed by a provider module when a module descriptor, corresponding to the provider module, includes an "exports" expression with the package identified as a parameter. The package may be exported to a set of specified modules (referred to as "qualified export") or to all other modules in the module system (referred to as "unqualified export").

A particular module element may be exposed by exposing of the particular module element itself or by exposing another module element which includes the particular module element. In one example, a class may be exposed by exposing a package which includes the class. Class members of the class are also exposed by exposing of the package which includes the class.

Access Modifiers for Module Elements

In an embodiment, a module element is declared with an access modifier. The access modifier expresses an accessibility configuration of the module element. The accessibility configuration declares whether or not the module element is publicly accessible. In one example, the modifier "public" indicates that a module element is publicly accessible and the modifier "private" indicates that the module element is not publicly accessible.

In an embodiment, an access modifier which declares a module element as not publicly accessible may be overridden by setting an accessibility configuration override (e.g., by invoking the setAccessible( ) method of the Java reflection API). The accessibility configuration override configures the module element (with the not publicly accessible configuration) as if the module element were declared with an accessibility configuration declaring the module element publicly accessible.

Access to Module Elements

As noted above, a module element of a provider module (1) may or may not be exposed to a consumer module and (2) may or may not be a publicly accessible module element. The module element of a provider module is accessible to a different consumer module if:
  (a) the module element has been exposed to the consumer module; and
  (b) the module element is publicly accessible (either by the access modifier declaring the module element as publicly accessibly or by the accessibility configuration override setting the module element as publicly accessible).

In an example, a module element of a provider module is declared as publicly accessible. The module element is exposed to a first consumer module but not exposed to a second consumer module. The first consumer module may access the module element of the provider module. However, the second consumer module is prohibited from accessing the module element of the provider module.

4. Generating Dynamic Modular Proxies

Figure 4A:
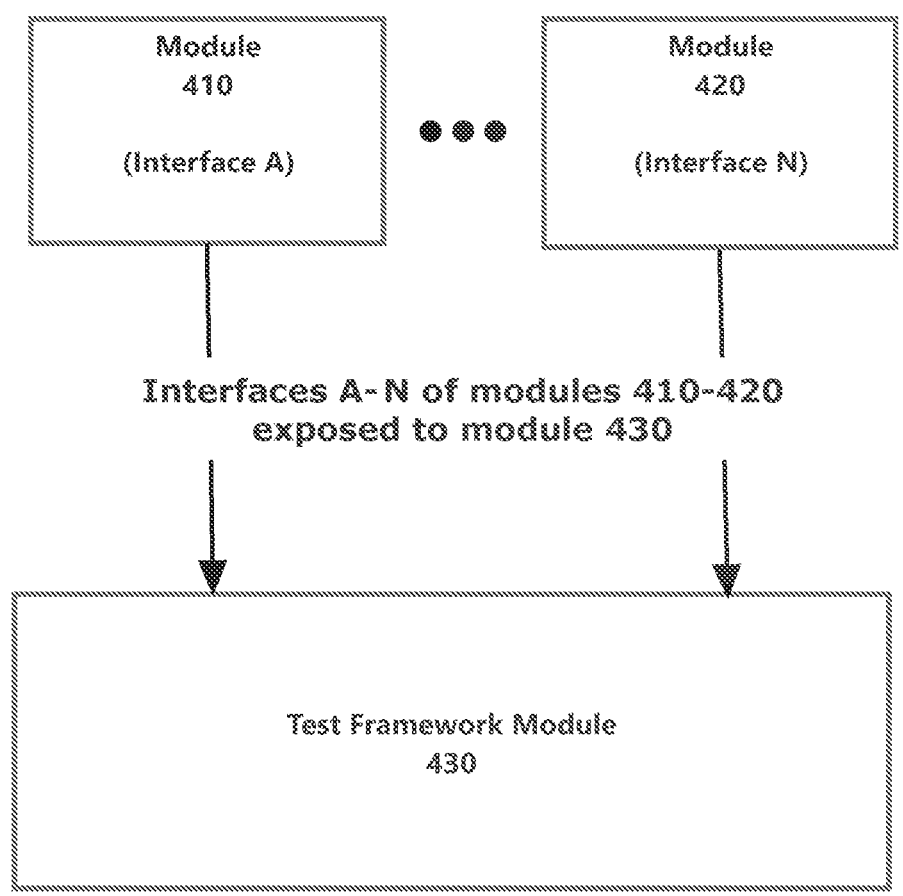
FIGS. 4A and 4B illustrate examples of one or more module systems in accordance with one or more embodiments.
Figure 4B:
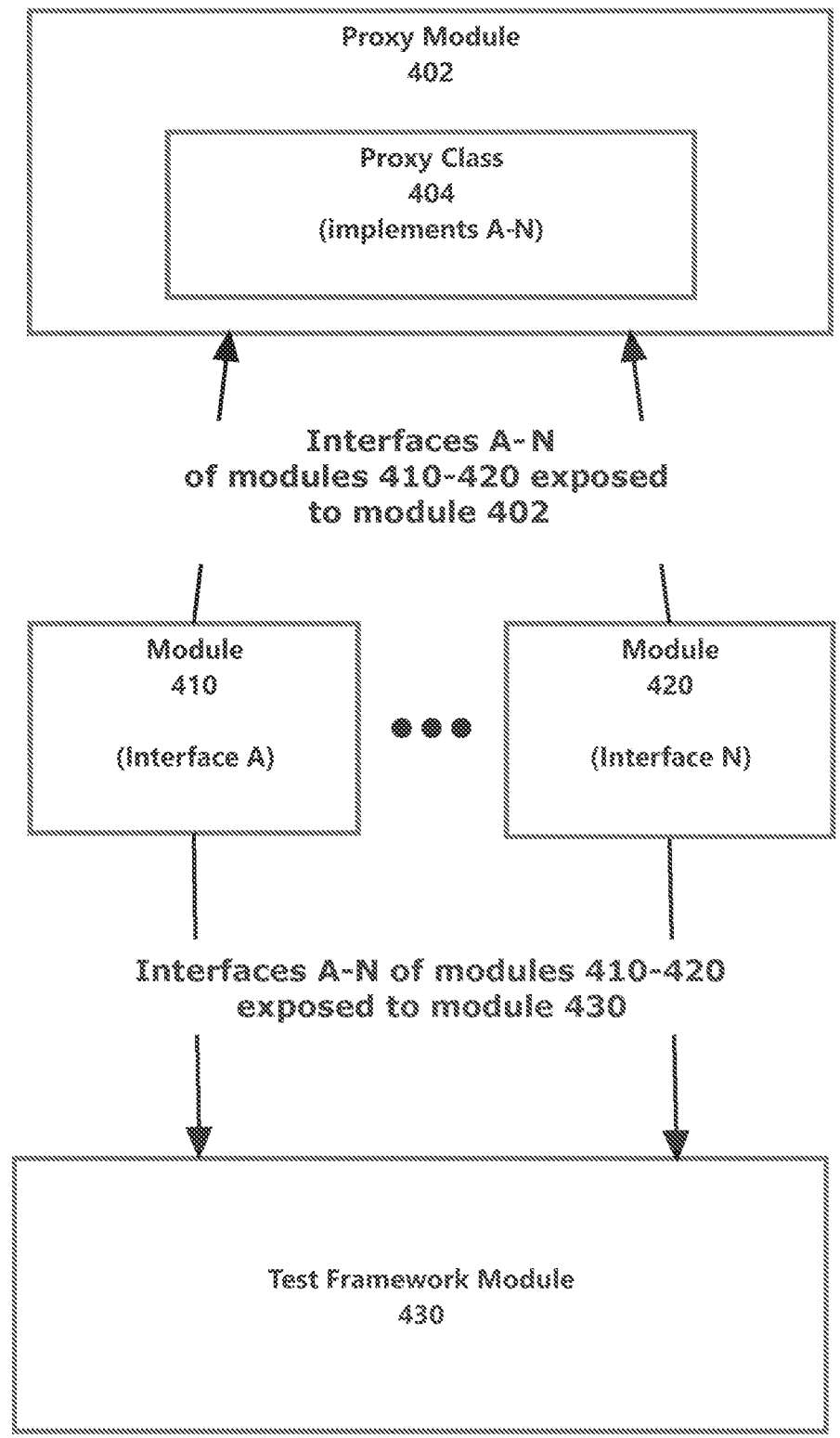

FIGS. 4A and 4B illustrate examples of one or more module systems in accordance with one or more embodiments. Other embodiments may include more or less modules than illustrated in FIGS. 4A and 4B. Furthermore, modules in other embodiments may include more, less, and/or different module dependencies and/or module elements than described below. Accordingly, the scope of the claims should not be construed as being limited by the specific examples herein.

FIG. 4A illustrates a particular state of a module system. As illustrated in FIG. 4A, the particular state of the module system includes a test framework module 430. A test framework module is any module that includes a set of code ("test framework") to test the interfaces of modules in the module system. Modules 410-420 represent any number of modules, each with one or more interfaces (e.g., interfaces A-N) that are to be tested by the set of code in the test framework module 430. The set of code, while illustrated in a separate test framework module (i.e., test framework module 430), may instead be included in one of the modules with interfaces being tested.

In an embodiment, each of the interfaces A-N of modules 410-420 is exposed to the test framework module 430. Exposing each of the interfaces A-N of modules 410-420 may be performed by exposing of packages in each of modules 410-420 that include interfaces A-N.

The exposing of the interfaces A-N to the test framework module 430 in the particular illustrated state of FIG. 4A may instead be completed in a different state of the module system (e.g., a second state of the module system as illustrated in FIG. 4B when the interfaces A-N are exposed to the proxy module 402). Furthermore, any other set of code (e.g., standard application code) in any other module (e.g., a standard application module) may be implemented instead of the test framework in the test framework module 430. The test framework module 430 is specifically referenced and described in detail for purposes of explanation and clarity.

In an embodiment, FIG. 4B illustrates a second state of the module system. In the second state of the module system, a runtime environment has created proxy class 404 that implements interfaces A-N. In one example, a proxy class (defined in the Java reflection API) is a class created at runtime that implements a specified list of interfaces, known as proxy interfaces. A proxy object is an instance of a proxy class. Each proxy object has an associated method call processor object. An example of a method call processor object is an invocation handler object, which implements the interface InvocationHandler. A method invocation on a proxy object through one of its proxy interfaces will be dispatched to the invoke method of the instance's invocation handler, passing the proxy object, a java.lang.reflect.Method object identifying the method that was invoked, and an array of type Object containing the arguments. The invocation handler processes the encoded method invocation as appropriate and the result that it returns will be returned as the result of the method invocation on the proxy object.

In an embodiment, the proxy class 404 is in a particular module, i.e., proxy module 402. A proxy module, as referred to herein, is any module that includes the proxy class 404. In an embodiment, in the second state of the module system, the runtime environment has exposed each of the interfaces A-N from modules 410-420 to the proxy module 402.

Operations for a runtime environment to (a) generate the proxy class 404 in a proxy module 402 and (b) expose the interfaces of other modules to the proxy module, as illustrated in FIG. 4B, are described below in detail with reference to FIGS. 5A and 5B.

Other embodiments may include more, less, and/or different operations than the operations described below with reference to FIGS. 5A and 5B. Furthermore, other embodiments may execute the operations in a different order than described below. Other embodiments may include a different set of code, unrelated to a testing framework, configured for performing one or more of the operations described below. Accordingly, the specific operations, order thereof, or performer thereof should not be construed as limiting the scope of any of the claims.

Figure 5A:
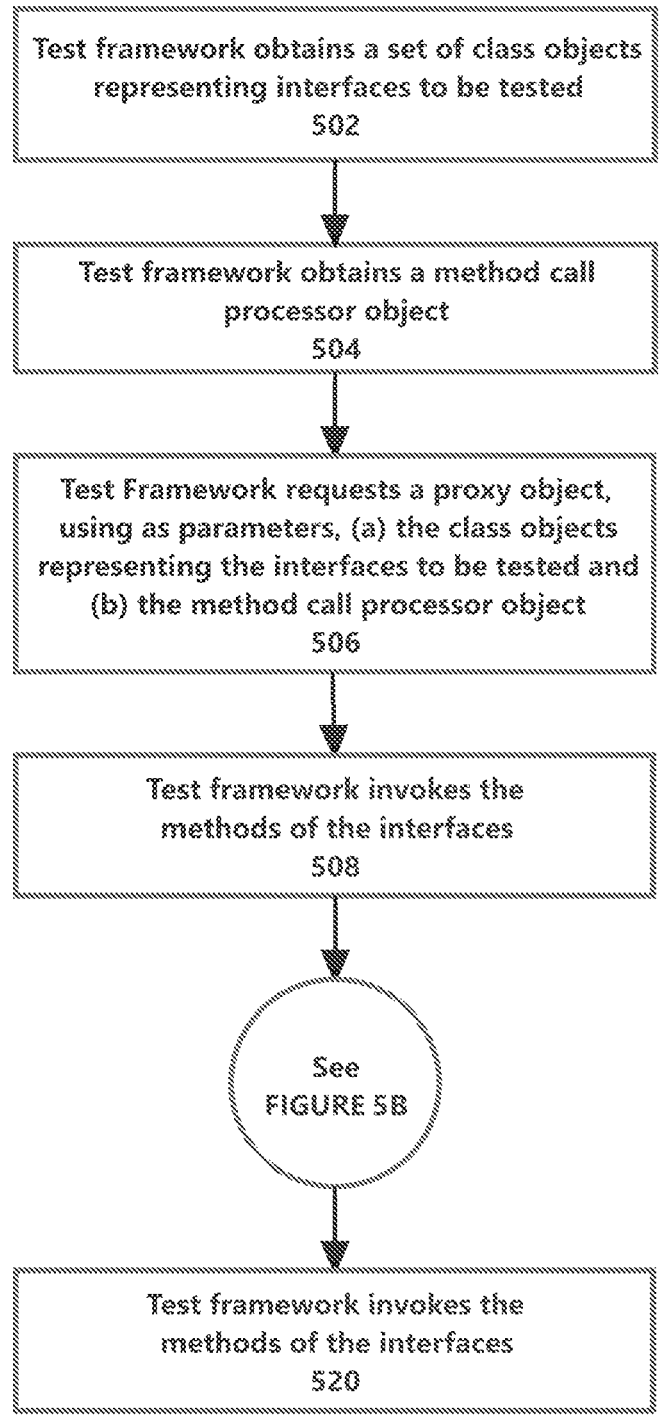
FIGS. 5A and 5B illustrate operations in accordance with one or more embodiments.

FIG. 5A illustrates an example set of operations performed by a set of code ("test framework") in a test framework module. The set of operations performed by the test framework result in the runtime environment generating the proxy class in a proxy module as described below with reference to FIG. 5B.

Initially, a test framework obtains a set of class objects representing interfaces that have been exposed to the test framework (Operation 502). The test framework may receive the class objects (representing interfaces) as arguments from the ultimate consumer code. The test framework may create the class objects (representing interfaces) via java.lang.ClassLoader.loadClass method that loads the bytes of .class file from disk and then defines classes to the virtual machine, e.g. via the define Class method of java.lang.ClassLoader. The test framework may create the class objects (representing interfaces) indirectly, using the Java reflection API. For example, the test framework may invoke the java.lang.Class.forName(String className) method which returns the Class object associated with the class or interface identified in the arguments of the method.

In an embodiment, the test framework obtains a method call processor object (Operation 504). The test framework may instantiate a class implementing a method call processor to obtain the method call processor object. In an example, the test framework instantiates a user-defined class myInvocationHandler which implements an interface InvocationHandler in the Java reflection API. The test framework may receive the method call processor object as an argument from the ultimate consumer code. The test framework may create the method call processor object via java.lang.ClassLoader.loadClass method that loads the bytes of myInvocationHandler.class file from disk and then defines classes to the virtual machine, e.g. via the define Class method of java.lang.ClassLoader. The test framework may create the method call processor object indirectly, using the Java reflection API.

In an embodiment, the test framework requests a proxy object based on the class objects (representing the interfaces) and the method call processor object (Operation 506). Requesting the proxy object may include invoking a method with parameters (a) an array of the class objects (representing the interfaces and (b) the method call processor object. The method invocation may further specify a particular class loader as a parameter. In an example, the test framework requests a proxy object from the proxy subsystem by invoking the newInstance method of java.lang.reflect.Proxy and passing at least (a) an array of the class objects representing the interfaces and (b) an object of myInvocationHandler type.

The test framework obtains the proxy object from the runtime environment as a result of the request for the proxy object in accordance with one or more embodiments (Operation 508). The creation of the proxy object by the runtime environment is described in detail below with reference to FIG. 5B.

In an embodiment, the test framework uses the proxy object to invoke the methods of the interfaces (Operation 520). The test framework may use reflective operations (e.g., from the Java reflection API) to invoke the methods of the interfaces. Even though the test framework is able to obtain the proxy object from the runtime environment, the test framework cannot itself instantiate the proxy class because the proxy class (in a proxy module) has not been exposed to the test framework module that includes the test framework.

In an example, the test framework may use the following code set (expressed in pseudocode) to request a proxy object and invoke the methods of interfaces using reflective operations executed on the proxy object:

```
Object o = { request to make proxy object }
Class c = o.getClass( );           //get proxy class of proxy object
Class[ ] is = c.getInterfaces( );  //array of class objects representing
                                   interfaces
for (Class i : is) {               //traverse all interfaces
    Method[ ] ms = i.getMethods( ) // array of methods for the
                                   interface
    for (Method m: ms) {           //traverse each method
                                   of the interface
        m.invoke(random arguments)
                                   //invoke methods for testing
    }
}
```

Figure 5B:
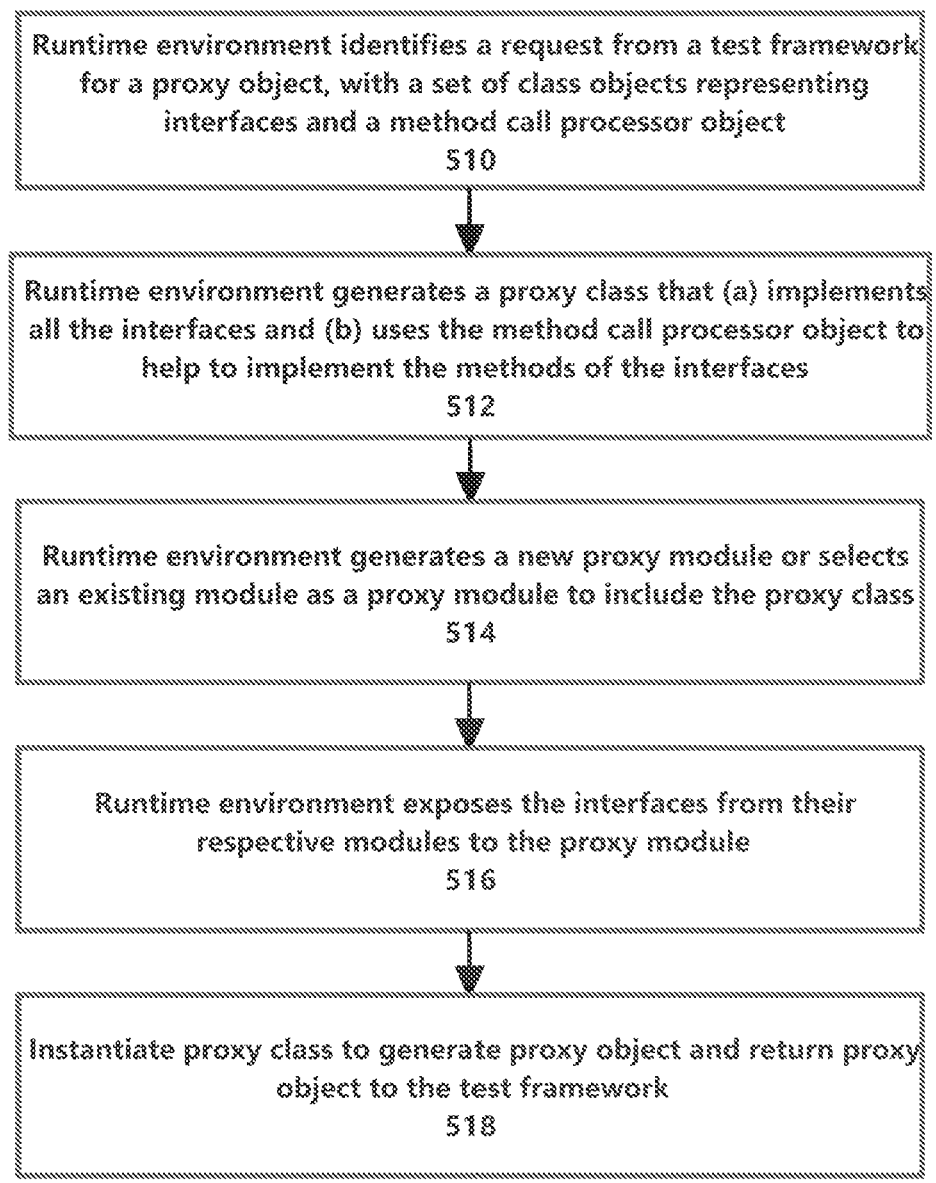

Referring now to FIG. 5B, the creation of the proxy class and the proxy object are described below with reference to Operations 510-518. The runtime environment identifies the request from the test framework, for the proxy object, that includes as parameters: (a) an array of class objects representing interfaces and (b) a method class processor object (Operation 510). As noted above, the request for the proxy object may further include a class loader as a parameter. The runtime environment detects the request during the execution of the test framework. The proxy class, to-be-instantiated to create the proxy object, does not exist when the request for the proxy object is detected by the runtime environment.

In an embodiment, the runtime environment generates a proxy class that (a) implements all of the interfaces represented by the class objects in the request for the proxy object and (b) uses the method call processor object to help to implement the methods of the interfaces. (Operation 512). The runtime environment identifies the declarations of the interfaces based on the class objects that represent the interfaces. The runtime environment generates a proxy class using the declarations of the interfaces.

In an example, each of the declarations of the interfaces A-N may include but are not limited to the structural elements as illustrated below with reference to interface A, each interface having any number of respective methods:

```
interface A
{
void a_Method1( );
...
void a_MethodAM( );  //AM is the total
number of methods in interface A
}
```

The proxy class which is generated by the runtime environment and which implements each of the interfaces A-N may include but is not limited to one or more structured elements as illustrated below:

```
class $Proxy$ implements A-N //name of proxy
class selected by runtime environment
{
    // methods of interface A
    void a_Method1( ) {...Invoke 'a_Method1'
    on method call processor...}
    void a_Method2( ) {... Invoke 'a_Method2'
    on method call processor...}
    ...
    void a_MethodAM( ) {... Invoke 'a_MethodAM'
    on method call processor...}
    //AM is the total number of methods of interface A
    // methods of interface B
    void b_Method1( ) {... Invoke 'b_Method1'
    on method call processor...}
    void b_Method2( ) {... Invoke 'b_Method2'
    on method call processor...}
    ...
    void b_MethodBM( ) {... Invoke 'b_MethodBM'
    on method call processor...}
    //BM is the total number of methods of interface B
    ...
    // methods of interface N
    void n_Method1( ) {... Invoke 'n_Method1'
    on method call processor...}
    void n_Method2( ) {... Invoke 'n_Method2'
    on method call processor...}
    ...
    void n_methodNM( ) {... Invoke 'n_MethodNM'
    on method call processor...}
    //NM is the total number of methods of interface N
}
}
```

In an embodiment, an access modifier declaring whether or not the proxy class is publicly accessible is determined based on accessibility configuration of the interfaces and/or whether the interfaces are exposed to other modules.

In an embodiment, the runtime environment (a) generates a new proxy module that is to include the proxy class or (b) selects an existing module defined by the module system as a proxy module to include the proxy class (Operation 514). In at least one embodiment, the runtime environment does not expose the proxy class in the proxy module to any other module in the module system.

In one example, a new proxy module is always generated for the proxy class. In another example, the proxy class is always added to an existing module. In yet another example, the generation or selection of the proxy module depends on accessibility configuration of the interfaces and/or whether the interfaces are exposed to other modules.

In an embodiment, the runtime environment exposes all of the interfaces (in respective modules), that are to be implemented by the proxy class, to the proxy module which includes the proxy class (Operation 516). In an example, the runtime environment exposes the interfaces to the proxy module by modifying the descriptors of the modules which include the interfaces. Specifically, the runtime environment may modify the descriptor of a module to expose the interface to the proxy module. In another example, the runtime environment may expose the interfaces to the proxy module without modifying the descriptors of the modules which include the interfaces. In this example, the runtime environment may expose the interfaces to the proxy module by updating a data set indicating which module elements (e.g., interfaces) of one or more modules are exposed to the proxy module. This data set is used by the runtime environment to determine which module elements of a provider module are exposed to which consumer module.

In an embodiment, the runtime environment instantiates the proxy class to generate a proxy object and returns the proxy object to the requesting test framework (Operation 518). Instantiating the proxy object may include invoking a constructor for the proxy class. The constructor may be defined by the runtime environment or accessed from a predefined API.

In one example, the interfaces to be tested include at least two particular interfaces in two different respective modules. The two particular interfaces are declared with access modifiers declaring the interfaces to be publicly accessible. However, the particular interfaces are not exposed by respective modules to any of the other modules in the module system. As a result, each of the two particular interfaces are "module private" and accessible only to the module elements within the same module as the interfaces. Conventionally, a proxy class would not be able to implement a non-exposed interface in a different module than the proxy class. Even if the proxy class was in a same module as one of the two particular interfaces, the proxy class would be restricted from implementing the other of two particular interfaces that is in a different module than the proxy class. One or more embodiments include the runtime environment exposing the two particular interfaces to the proxy module using a qualified export, thereby allowing the proxy class in the proxy module to implement both interfaces defined in the different modules than the proxy module. A qualified export exposes the two particular interfaces to the proxy module without exposing the two particular interfaces to other modules within the module system. Furthermore, the two particular interfaces are exposed to a test framework module which can test the methods of the two particular interfaces without being able to instantiate the proxy class which implements the two particular interfaces. Specifically, the test framework is unable to instantiate the proxy class because the proxy class, in the proxy module, is not exposed to the test framework module. The test framework module tests the methods of the two particular interfaces at least by using reflective operations on a proxy object of the proxy class type.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
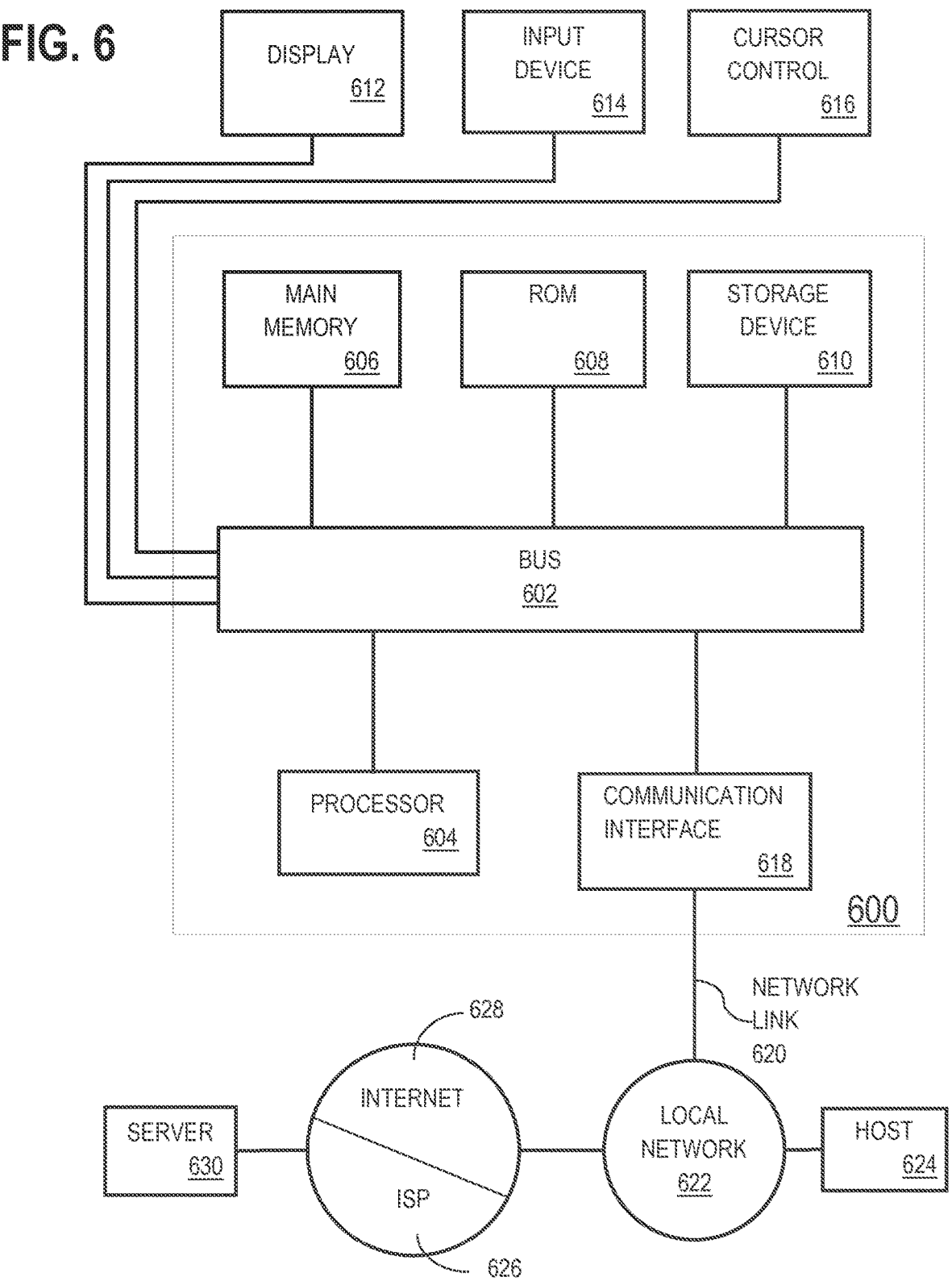
FIG. 6 illustrates a system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another kind of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding kind of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:
    identifying a first request for a first proxy object, the first request comprising a first class object representing a first proxy interface;
    responsive to identifying the first request for the first proxy object, generating, during runtime, a first proxy class that implements the first proxy interface and is associated with a method call processor;
    determining that the first proxy interface is private to a first module of a plurality of modules;
    responsive to determining that the first proxy interface is private to the first module of the plurality of modules, generating, during runtime, a new module to include the first proxy class, wherein the new module is restricted from accessing any module element, associated with the plurality of modules, that is not exposed to the new module, and the plurality of modules are restricted from accessing any module element in the new module;
    causing the first proxy interface to be exposed by the second first module to the first new module without exposing the first proxy interface to other modules of the plurality of modules, wherein invocations of methods in the exposed first proxy interface on the proxy object are dispatched to the method call processor.

2. The medium of claim 1, wherein the operations further comprise:
    generating the first proxy object associated with the first proxy class, wherein a first method associated with the first proxy object invokes a second method associated with the first proxy interface;
    responsive to determining that the first proxy interface is exposed by the first module to the new module: permitting the first proxy object to access the first proxy interface.

3. The medium of claim 1, wherein the operations further comprise:
    identifying a second request to execute a first method associated with the first proxy object, wherein the first method associated with the proxy object invokes a second method associated with the proxy interface;

responsive to determining that the first proxy interface is exposed by the first module to the new module: permitting execution of the first method associated with the first proxy object.

4. The medium of claim 1, wherein generating, during runtime, the new module to include the first proxy class is further performed based on a class loader parameter associated with the first proxy object.

5. The medium of claim 1, wherein the operations further comprise:
setting a module descriptor associated with the new module to include an explicit dependency on the first module.

6. The medium of claim 1, wherein causing the proxy interface to be exposed by the first module to the first new module comprises:
setting a module descriptor associated with the first module to include an exportation of the first proxy interface to the new module.

7. The medium of claim 1, wherein causing the proxy interface to be exposed by the first module to the new module comprises:
identifying a data set that is used by a runtime environment to determine which module elements are exposed to each of the plurality of modules;
updating the data set to indicate that the proxy interface is exposed to the new module.

8. The medium of claim 1, wherein the operations further comprise:
identifying a second request for a second proxy object, the second request comprising a second class object representing a second proxy interface;
generating a second proxy class associated with the second proxy interface;
selecting the new module to include the second proxy class;
identifying a second module, of the plurality of modules, that includes the second proxy interface;
causing the second proxy interface to be exposed by the second module to the new module.

9. The medium of claim 1, wherein the operations are executed by a runtime environment.

10. A system, comprising:
at least one device including a hardware processor; and
the system being configured to perform operations comprising:
identifying a first request for a first proxy object, the first request comprising a first class object representing a first proxy interface;
responsive to identifying the first request for the first proxy object, generating, during runtime, a first proxy class that implements the first proxy interface and is associated with a method call processor;
determining that the first proxy interface is private to a first module of a plurality of modules;
responsive to determining that the first proxy interface is private to the first module of the plurality of modules, generating, during runtime, a new module to include the first proxy class, wherein the first new module is restricted from accessing any module element, associated with the plurality of modules, that is not exposed to the new module, and the plurality of modules are restricted from accessing any module element in the new module;
causing the first proxy interface to be exposed by the first module to the new module without exposing the first proxy interface to other modules of the plurality of modules, wherein invocations of methods in the exposed first proxy interface on the proxy object are dispatched to the method call processor.

11. The system of claim 10, wherein the operations further comprise:
generating the first proxy object associated with the first proxy class, wherein a first method associated with the first proxy object invokes a second method associated with the first proxy interface;
responsive to determining that the first proxy interface is exposed by the first module to the new module: permitting the first proxy object to access the first proxy interface.

12. The system of claim 10, wherein the operations further comprise:
identifying a second request to execute a first method associated with the first proxy object, wherein the first method associated with the proxy object invokes a second method associated with the proxy interface;
responsive to determining that the first proxy interface is exposed by the first module to the new module: permitting execution of the first method associated with the first proxy object.

13. The system of claim 10, wherein generating, during runtime, the new module to include the first proxy class is further performed based on a class loader parameter associated with the first proxy object.

14. The system of claim 10, wherein the operations further comprise:
setting a module descriptor associated with the new module to include an explicit dependency on the first module.

15. The system of claim 10, wherein causing the proxy interface to be exposed by the first module to the new module comprises:
setting a module descriptor associated with the first module to include an exportation of the first proxy interface to the new module.

16. The system of claim 10, wherein causing the proxy interface to be exposed by the first module to the new module comprises:
identifying a data set that is used by a runtime environment to determine which module elements are exposed to each of the plurality of modules;
updating the data set to indicate that the proxy interface is exposed to the new module.

17. The system of claim 10, wherein the operations further comprise:
identifying a second request for a second proxy object, the second request comprising a second class object representing a second proxy interface;
generating a second proxy class associated with the second proxy interface;
selecting the new module to include the second proxy class;
identifying a second module, of the plurality of modules, that includes the second proxy interface;
causing the second proxy interface to be exposed by the second module to the new module.

18. A method, comprising:
identifying a first request for a first proxy object, the first request comprising a first class object representing a first proxy interface;
responsive to identifying the first request for the first proxy object, generating, during runtime, a first proxy class that implements the first proxy interface and is associated with a method call processor;

determining that the first proxy interface is private to a first module of a plurality of modules;
responsive to determining that the first proxy interface is private to the first module of the plurality of modules, generating, during runtime, a new module to include the first proxy class, wherein the first new module is restricted from accessing any module element, associated with the plurality of modules, that is not exposed to the new module, and the plurality of modules are restricted from accessing any module element in the new module;
causing the first proxy interface to be exposed by the first module to the new module without exposing the first proxy interface to other modules of the plurality of modules, wherein invocations of methods in the exposed first proxy interface on the proxy object are dispatched to the method call processor;
wherein the method is performed by at least one device including a hardware processor.

19. The medium of claim 1, wherein the request includes a second class object representing a second proxy interface, wherein the operations further comprise:
determining that the second proxy interface is private to a second nodule of the plurality of modules;
wherein the first proxy class that is generated during runtime further implements the second proxy interface;
wherein the second proxy interface is exposed by the second module to the new module without exposing the second proxy interface to the other modules of the plurality of modules including the first module;
wherein invocations of methods exposed in the second proxy interface on the proxy object are dispatched to the method call processor.

20. The medium of claim 1, wherein causing the first proxy interface to be exposed by the first module to the new module comprises performing, by a runtime environment, a qualified export of a package including the first module.

* * * * *

UNITED STATES PATENT AND TRADEMARK OFFICE
CERTIFICATE OF CORRECTION

PATENT NO. : 10,684,827 B2  
APPLICATION NO. : 16/110702  
DATED : June 16, 2020  
INVENTOR(S) : Buckley et al.

It is certified that error appears in the above-identified patent and that said Letters Patent is hereby corrected as shown below:

In the Specification

In Column 5, Line 26, delete "(1/0)" and insert -- (I/O) --, therefor.

In Column 8, Line 42, delete "310" and insert -- 310. --, therefor.

In Column 14, Line 19, delete "define Class" and insert -- defineClass --, therefor.

In Column 14, Line 38, delete "define Class" and insert -- defineClass --, therefor.

In the Claims

In Column 20, Line 47, in Claim 1, before "first" delete "second".

In Column 20, Line 47, in Claim 1, before "new" delete "first".

In Column 21, Line 15, in Claim 6, before "new" delete "first".

In Column 21, Line 59, in Claim 10, before "new" delete "first".

In Column 23, Line 6, in Claim 18, before "new" delete "first".

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*